United States Patent [19]

Nelson

[11] 4,380,695
[45] Apr. 19, 1983

[54] CONTROL OF TORCH POSITION AND TRAVEL IN AUTOMATIC WELDING

[75] Inventor: Jerome W. Nelson, Houston, Tex.

[73] Assignee: Crutcher Resources Corporation, Houston, Tex.

[21] Appl. No.: 702,865

[22] Filed: Jul. 6, 1976

[51] Int. Cl.³ .............................................. B23K 9/12
[52] U.S. Cl. ......................... 219/125.12; 219/124.22; 219/124.34
[58] Field of Search ............. 219/124, 125 R, 125 PL, 219/137 R, 125.12, 124.34, 124.22; 228/8, 9, 10, 11, 12; 318/569, 576, 635, 650, 652, 686, 127

[56] References Cited

U.S. PATENT DOCUMENTS

| | | | |
|---|---|---|---|
| 2,944,141 | 7/1960 | Lovrenich | 219/125 PL |
| 3,179,786 | 4/1965 | Greene | 219/125 PL |
| 3,346,807 | 10/1967 | Wood et al. | 219/125 PL |
| 3,484,667 | 12/1969 | Wofsey | 219/125 PL |
| 3,621,183 | 11/1971 | Chambonnet | 219/125 PL |
| 3,646,309 | 2/1972 | Smith, Jr. et al. | 219/125 PL |
| 3,989,921 | 11/1976 | Ohi et al. | 219/125 R |
| 4,166,941 | 9/1979 | Cecil | 219/124.34 |

FOREIGN PATENT DOCUMENTS

| | | | |
|---|---|---|---|
| 147705 | 9/1961 | U.S.S.R. | 219/125 PL |
| 253974 | 4/1970 | U.S.S.R. | 219/137 R |
| 288189 | 2/1971 | U.S.S.R. | 219/124 |
| 371041 | 5/1973 | U.S.S.R. | 219/125 PL |

Primary Examiner—C. C. Shaw
Attorney, Agent, or Firm—Richards, Harris & Medlock

[57] ABSTRACT

To maintain control of arc position in travel along a predetermined welding path, wherein the arc or equivalent heat source is given at least a minimal lateral reciprocation, an electrical characteristic, such as current, is sampled to obtain a continuous signal containing a component which varies with lateral position of the heat source. The first signal is also sampled at the extreme lateral positions of the arc to obtain comparable signal elements which are accumulated, amplified, compared with each other and/or with reference signals, and resultant outputs are used to initiate corrective action. This action may involve giving warning to a human operator or it may involve partial or full control of a physical or mechanical correction procedure. A general application is to the welding of a groove formed between adjacent work pieces. A more specific application is to weld joints involving narrow gaps between length of large pipe in pipeline building. The invention is applicable also to situations wherein lateral oscillation is not really required for gap filling but is used merely as a means to isolate control signals for maintaining an accurate center or main line travel position of the arc of heat source. Moreover, the invention may have a more general application, wherever guidance is desired along a main path that contains any element that effects signal amplitude of a probe characteristic relative to the lateral position of the element where the signal may be masked by noise.

6 Claims, 16 Drawing Figures

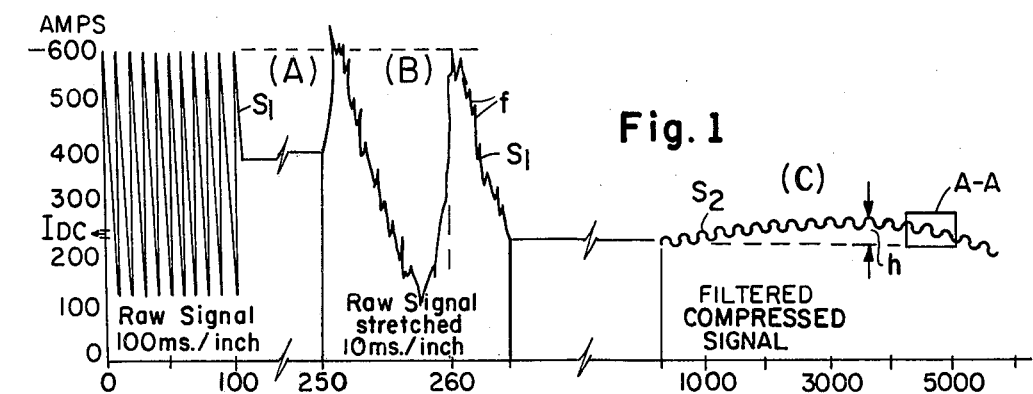
Fig. 1
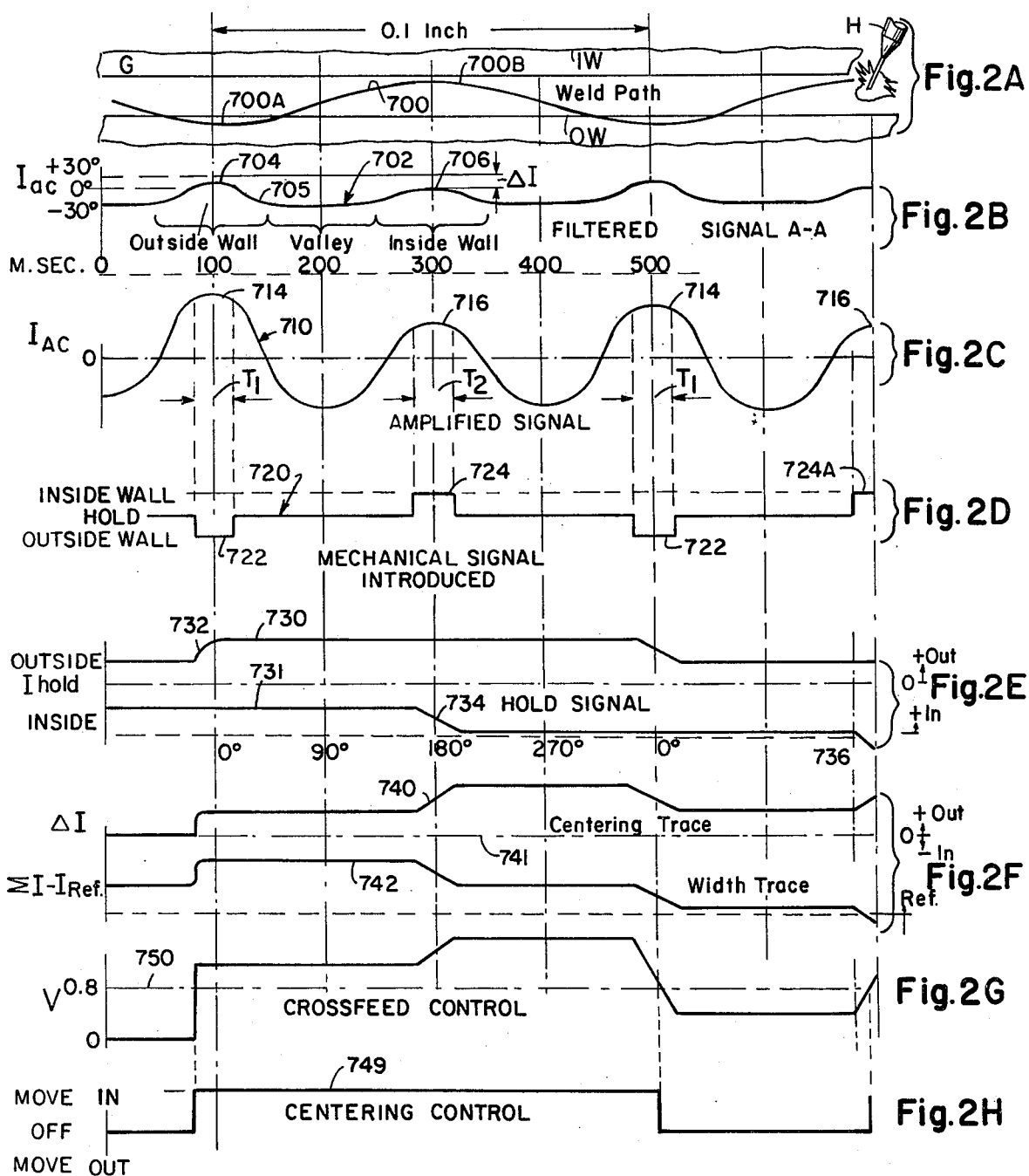

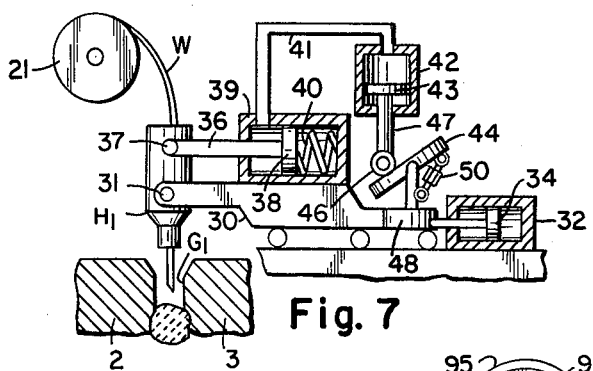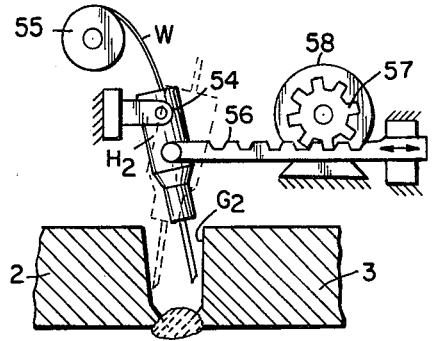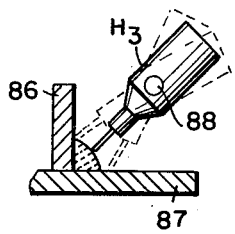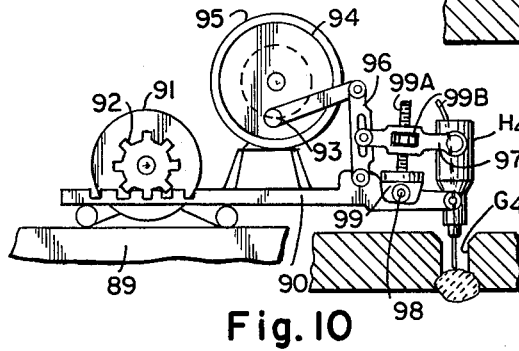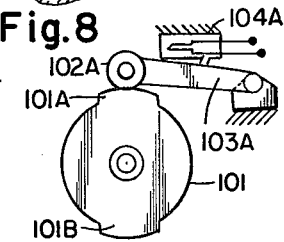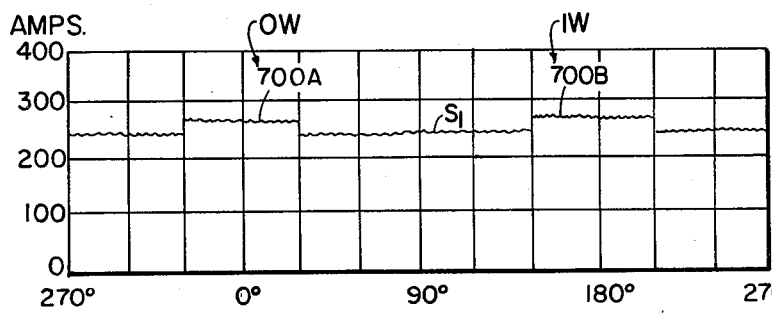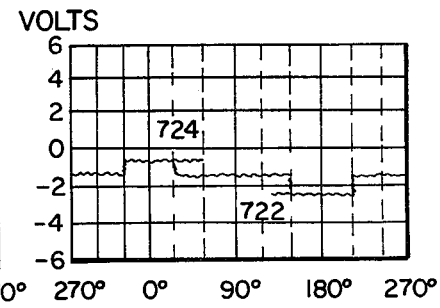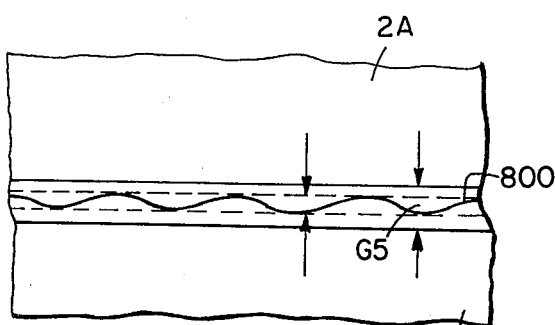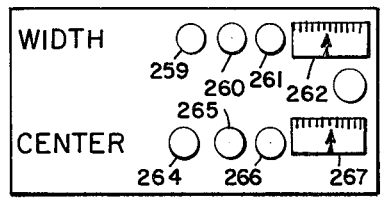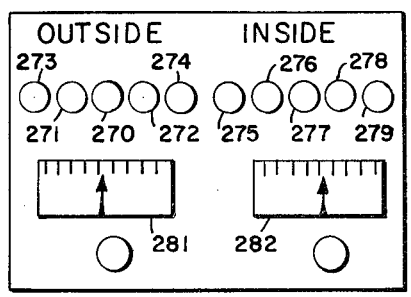

CONTROL OF TORCH POSITION AND TRAVEL IN AUTOMATIC WELDING WELDING

BACKGROUND AND PRIOR ART

In welding adjoining work pieces together, such as adjoining flat plates, lengths of pipe or annular objects of various kinds, and in many other situations, especially where a narrow gap is to be filled with metal, the alignment or lateral position of the arc or other heat source, such as electron beam, plasma jet, etc. with respect to a predetermined travel path, must be precisely controlled if a high quality joint is to be produced. Otherwise, inadequate bonding, or faults, burn-throughs, and other flaws may result.

In typical welding operations, the torch or welding instrument is moved along a predetermined main path and, in many cases, is moved in a sinusoidal pattern, i.e., laterally back and forth across the path or gap as it travels along it to insure proper placement of the molten metal being deposited. Maintaining alignment is a problem well recognized and many attempts have been made to solve it, without much success or with complete failure in some cases. With the best of alignment and control devices, it is often difficult or impossible to obtain the high precision control of arc position within a gap that is needed for high quality welding. If the arc or heat source approaches too closely to a wide wall, the wall may be cut or scored deeply, with resulting flaws; if it does not approach close enough, there may be a poor or inadequate bond between the filler metal and the wall.

Many attempts have been made to weld straight line and annular joints by automatic mechanism. Some pipe welding processes and equipment are described in U.S. Pat. Nos. 3,084,246, 3,268,707, 3,737,614, 3,748,433, 2,777,115, 3,646,309, 3,646,311 and others. In the last three patents mentioned, it is proposed to take certain electrical signals from the weld and make use of them to aid in control of certain welding parameters. However, in these cases, the signal is not conditioned for extraction but is merely a continuous wave without timing elements and is not at all suitable for the periodic but systematic control of arc position at critical points in oscillation cycles that is needed in many situations. So far as applicant is aware, none of the prior art proposals using signals from the welding instrument is suitable for controlling lateral oscillation width of the heat source accurately within a narrow gap.

Prior art suggestions have included the use of feelers or other mechanical sensing devices to follow along a groove or gap and help to correct or align the welding instrument with the work or joint. Such sensing devices, in applicant's experience, are often unreliable because spatter of molten metal from an arc, or the presence of foreign particles of any kind, often throw out or disable the sensing device. Moreover, the mechanisms usually proposed are not subject to accurate adjustment and control, even if corrective signals were faithfully obtained and used.

For automatic welding of pipelines, some rather successful processes have become available, including a procedure for first aligning and securing adjoining pipe lengths together internally, as in U.S. Pat. Nos. 3,461,264, 2,561,320, and 3,604,612. U.S. Pat. No. 3,806,694 describes a self-propelled welder apparatus with variable oscillation means, for reasonably good control of the oscillation of the head in pipeline welding. When such devices are used by a skilled attentive operator, excellent results are usually achieved but in the hands of less skilled or inattentive operators, difficulties still arise. A human operator, if not attentive, is not capable of perceiving trends to misalignment or improper oscillation patterns in time to prevent difficulties that can lead quickly to imperfect welds, and with long periods in adverse working conditions, any operator can easily become weary or inattentive.

A particular object of the present invention is to prevent these difficulties and to make it possible to apply corrective devices and procedures to equipment already in service without inordinate costs and complexities. A further object is to make improved procedures available to many types of welding other than pipeline joints, especially joints where narrow and relatively deep gaps are to be filled and properly bonded with filler metal supplied from a consumable electrode, such as fine wire.

The present invention is based on the discovery that by utilizing a generated signal available from a laterally oscillated heat source or probe, etc., and by proper sampling at critical welder instrument positions, corrective action may be indicated or initiated before a trend to misalignment or malposition of the instrument proceeds far enough to cause operating difficulties or weld imperfections.

While signals coming from the heat source, such as arc current, are conveniently used as a basis for the controls of the present process, it is to be understood that other characteristics which vary with lateral position can be used, such as voltage, power (current times voltage), or sound, light, etc., as will be obvious to those skilled in the art after an understanding of the present invention. Other signals or reference values also may be introduced to assist in control of the lateral travel of the instrument or heat source.

BRIEF DESCRIPTION OF DRAWINGS

FIGS. 1(A), 1(B), and 1(C) are graphs of signals used in the present process.

FIGS. 2A to 2H are a series of comparative graphs of signals and modified signals, related to times, as generated, isolated, sampled and used in the process or method of the present invention.

FIG. 7 is a diagrammatic and partly sectional view of apparatus involving hydro-mechanical equipment for control of welder head alignment and lateral movement.

FIG. 8 is a diagrammatic view, also partly in section, of simpler equipment for carrying out a varient process, showing means for accomplishing alignment mechanically.

FIG. 9 shows an operation wherein a welding head or torch is reciprocated in a corner about a relatively low center to obtain better angles of approach of the electrode to the gap walls.

FIG. 10 is a diagrammatic view, partly in section, of another mechanical system for accomplishing the adjustment and control of arc position according to the method of the present invention.

FIG. 11 is a partly diagrammatic view of an apparatus for taking timed samples or signal elements from a characteristic at the welder, being a variation of certain equipment shown in FIG. 3.

FIG. 12 is a graph showing certain electrical and signal characteristics pertinent to the invention.

FIG. 13 is another graphical representation, a variation of FIG. 12.

FIG. 14 is a diagrammatic view showing another variation of the process.

FIG. 15 is a diagrammatic plan view of a signal device or panel for display of data to guide a human operator in welding.

FIG. 16 is another modification of a device or panel, alternative to that of FIG. 15.

DESCRIPTION OF PREFERRED EMBODIMENT

Figure 3:
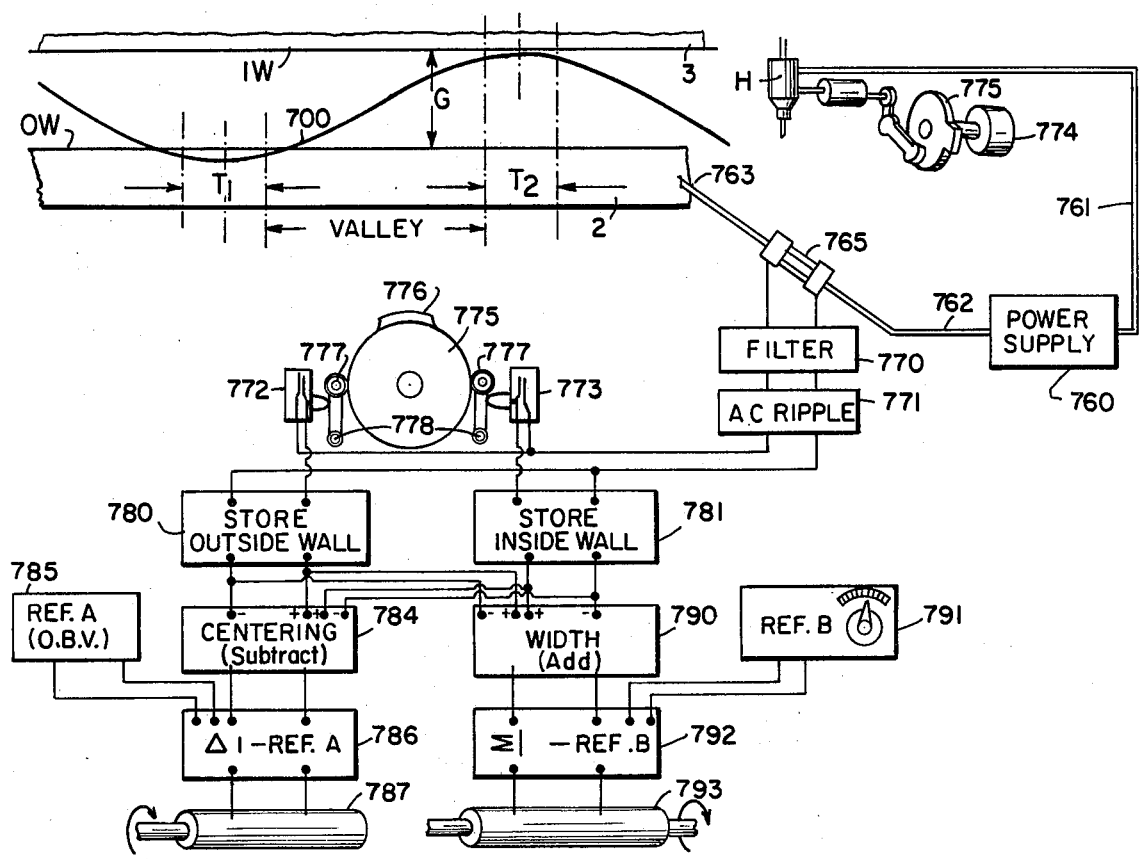
FIG. 3 is a partly schematic showing of the mechanical arrangement and partly diagrammatic view of circuitry of electrical components used for obtaining signals at the proper times and using them in the present process.

Referring first to FIG. 1(A), there is shown in part, a continuous signal or packet of typical wave forms found in an electric welding current, specifically an electric arc current when welding with an intermittent arc, as they might appear on an oscilloscope or on a high speed recording chart, the signal here being in compressed wave form. The raw signal $S_1$ is typical of one derived from an arc welding current having an average value around 240 to 250 amperes with extreme values from about 100 to 600 amperes. These wide fluctuations, as well known in the art, are due at least in part to the intermittent nature of a short arc or dip transfer; as known in the prior art, this is a most difficult wave form to analyze. Actually, the form shown in FIG. 1(A) is somewhat idealized, as its excursions between maximum and minimum values are not smooth. An expanded and more detailed view, on a wider time scale, is shown in FIG. 1(B) where numerous small fluctuations f are seen on each major excursion of the current, being superimposed on the main wave $S_1$. The packet of waves seen in FIG. 1(A) requires about 100 milliseconds (ms.), whereas that of FIG. 1(B) occurs in about 10 ms. in a typical arc welding operation.

As will be further explained below, a small amplitude AC signal is to be superimposed on and eventually isolated from the raw data wave of FIG. 1(A). This AC signal is later amplified, and it may be filtered, clipped, accumulated or processed through various steps for use as a monitor or for initiating control or correction of the welder position. Shown in highly compressed form, this processed signal $S_2$ is represented more or less ideally in FIG. 1(C). A small section is taken from this signal at A—A, and shown amplified and expanded in FIGS. 2(B), 2(C), etc., to be discussed next. It will be noted that the packet of FIG. 1(C) has a time period of several seconds and that it has a generally arched contour h indicating that a relatively very low frequency irrelevant masking signal may be superimposed on it. The latter may occur because of drifting of welding parameters and would be filtered out along with the high frequencies shown in FIG. 1(A), or modified as explained below.

FIGS. 2(A) and 2(H), inclusive, represent groups of related wave forms, all on the same time scale or abscissae. The time scales of these abscissae are expanded, time wise, along the horizontal axis to facilitate illustration and explanation of the several wave forms and their derivation.

The wave form 700, shown in FIG. 2(A), represents the sinuous path of a reciprocated welding instrument of head H as it travels along a main path between opposed side walls OW and IW, defining the width of the gap G that is to be filled or at least partly filled by one welding pass. Wave 700 of course, is produced mechanically. The head H is reciprocated or oscillated from side to side as it travels among the main path between work pieces 2 and 3, as shown also, e.g. in FIGS. 4 or 5. The upper wall IW of the gap of FIG. 2(A) may be referred to as the inside wall and the lower OW as the outside wall. Ideally, the torch of head H would come very close but usually would not actually contact the walls, if perpendicular; e.g., in arc welding; the electrode should approach but not touch them. If wire W comes too close, the wall may be gouged and a flaw result; if it does not come close enough, the weld may not fuse properly into the wall and another type of flaw may result.

In FIG. 2(A) (see also the top of FIG. 3), the trace or path 700 of the head H in its sinuous travel, is seen to be slightly offset towards the outside wall OH. It does not come quite close enough to the inside wall IW and needs correcting upwardly or to the inside. At point 700(A), the arc might be cutting into the wall OW; at point 700(B), it might not be welding soundly to the inside wall IW.

As noted above, the time axis is expanded; in actual welding head H traverses the gap G, typically about 0.30 inches (7.6 mm) wide, every 20th of an inch, that is, its travel along the main axis for each full cycle of lateral oscillation is in a typical case, about 0.10 inch or 2.54 mm. At a typical travel rate, the frequency of oscillation will be in the general range of 2 to 10 hz, preferably 3 to 6 reciprocation cycles per second.

The welding current in an arc tends to increase somewhat as the torch approaches a side wall; this increase is more marked as it approaches closer. The wave form 702, FIG. 2(B), shows this increase as a separate signal having peak values 704 to 706 as compared to its continuous or average continuous value. These represent a typical current increase at the lateral extreme arc positions (at the side walls). Between these peaks is shown a valley or null or average continuous value 705, representing no significant current increase across the middle part of gap G. A difference in heights of 704 and 706 is shown as $\Delta I$. It is emphasized that this is an ideal signal, not readily recognizable in the raw signal $S_1$ of FIGS. 1(A) and 1(B). It must be isolated before it becomes recognizable or useful, the method being part of the invention. This is accomplished by methods to be discussed and using filtering or other processing steps known generally in the prior electronic art.

The filtered signal 702 may be amplified in the next stage, to give the wave form 710, FIG. 2(C). In connection with this amplified signal, at points such as 714 and 716, corresponding to points 704 and 706 in the unamplified wave, FIG. 2(B), a mechanically timed sampling signal is generated, as shown at 720, FIG. 2(D), to relate the peaks 714 and 716 to the respective lateral positions in space of instrument H, FIG. 2(A), with respect to side walls IW and OW. At either wall, the head dwells momentarily and then recedes. The timing signal at outside wall OW is shown as a negative voltage at 722 on the wave form 720. On the inside wall IW, it is shown as a positive signal 724.

The amplified peak signals are held until the next reciprocation on a given side, as shown on the trace 730, FIG. 2(E). An outside wall hold control signal 722 rises in value as shown at 732 because it was of larger amplitude than the previous signal of that side and the value 732 is held in storage for full mechanical reciprocation back to the outside wall. Note that it has the value of peak 714, FIG. 2(C). Inside wall timing signal 724 causes peak 706 or 716 to be held separately as shown at 734 in FIG. 2(E). If another signal 724(A) of a different value is received at the next cycle, it replaces the preceding for that wall. Such is shown at 736, trace 731, where the chart, FIG. 2(E), turns down still farther, indicating a small absolute value.

In the next step, the difference or sum of signals 732 and 734 is determined by a suitable comparing operation to determine the correctness of the path center or width. The difference $\Delta I$ used for centering control appears at 740, FIG. 2(F). The sum $\Sigma I$ used for width control is shown at 742 and is compared with a fixed reference signal representing the desired width. For centering, if the differece between peak values 730 or 734 is negative, a mechanical centering or adjusting device (such as one of those to be described below) is set in operation, or a signal can be given to a human operator, to move the head of torch H towards the outside as seen in FIG. 2(A) or to the left in FIGS. 4 or 5. If the difference $\Delta I$ is positive, correction is made or indicated towards the inside, upward in FIG. 2(A) or to the right in FIGS. 4, 5, etc. Thus, incipient misalignment, even a small one, in the gap is corrected as needed.

When centering with a step type (on-off) control, a reference value is needed. Where the sum $\Sigma I$ of the two signals 734 and 734 exceeds the reference value of 0.8 volts, a value above which correction is needed shown at 750, FIG. 2(G), the cross-feed or head centering control signal when over a +0.8 volt value activates the centering control switch signal to move the head H to the inside. Where $\Sigma II$ IS BETWEEN reference values such as +0.8 and −0.8 volts, no correction in width is made or needed. If it were below a −0.8 volt value, an outside movement would have been activated. Although not shown, the same type of operation can be used with the width indicating signal 742 in FIG. 2(F) to activate a width control device.

FIG. 3 shows schematically a combination of mechanical means and electronic circuits in block or unit form for carrying out the process just described. The gap G is shown at the top between the walls IW and OW, along with a short segment of the wave form 700 described above. The welding head H is supplied with power from a generator or power supply 760, through line 761, its other lead 762 being grounded to the work piece 2 at 763. A shunt 765 connected into the ground line provides a current signal which typically has a continuous fluctuating value. Inherently, the welding current tends to rise as the torch H approaches either wall. The signal, which is linearly proportional to the arc current in the ground cable 762, is first passed through a filter 770 to take out the higher frequencies of FIGS. 1(A) and 1(B). This leaves the meaningful signals 704 and 706, FIG. 2(B), along with some lower frequencies that may be present, such as those referred to above of amplitude h (the upward bow in FIG. 1C), which are caused by other factors at the arc. To eliminate this and other low frequencies tht may be present, the signal is next passed from high frequency filter 770 to a low band filter or AC ripple pass filter 771. This leaves essentially the desired signal 702, FIG. 2(B), which is amplified to become signal 710, FIG. 2(C), having the peaks 714 and 716 derived from current increases while the head H is in close proximity to one or the other of the gap side walls.

In order to relate the signal 710 to arc position laterally of the gap, a sampling device in the form of a commutator is used to produce a timed signal and limit it to the narrow band of time during which the arc is at or very near a side wall. While this commutator may be any of several obvious designs, it is shown in FIG. 3 as consisting of a pair of microswitches 772 and 773 connected in parallel to other connections, mentioned below, from the output of the AC ripple filter 771. Means are provided for closing and opening these switches at the appropriate times. The latter means includes a rotatable cam plate 775, driven by an appropriate motor in synchronism with the cycle of the traversing or oscillating mechanism which moves the head back and forth across the gap or groove G. It may, in fact, be directly connected to such a drive. Cam plate 775 includes a lobe 776 which operates on followers 777 attached to pivoted arms 778, arranged to alternately close one microswitch 772 or the other, 773, at each half cycle extreme of oscillation of the head H.

The other terminals of switches 772 and 773 are connected respectively to an outside wall signal sample storage or hold unit 780 and an inside wall hold unit 781. The other lead from the band pass filter 771 is connected to these also. The time duration of each sample taking is indicated at $T_1$ for the outside wall and $T_2$ for the inside wall, top of FIG. 3. Ordinarily, it lasts for about 30° to 75°, preferably about 60° of the full 360° oscillation or reciprocation cycle, for each side. See also, FIGS. 2(D) and 6.

Thus, the current rise or peak at the outside wall is fed into the system and amplified, as at 714, FIG. 2(C), and that at the inside wall is amplified at 716. The amplifiers are conventional and are not shown in FIG. 3. The signal fed into unit 780 is held as at 730, FIG. 2(E), and that at the inside wall, unit 781, is held at 731, as mentioned above.

The outputs of units 780 and 781, FIG. 3, are fed to a comparator 784 to determine their difference $\Delta I$, if any. See also FIG. 2(B). This value $\Delta I$ is compared with the standard reference value from fixed voltage source 785, FIG. 3, in a second comparator 786 and is used to activate the motor when exceeded. If in this second comparator output $\Delta I$ has a value greater than reference A, the output to a centering control device 787 causes the latter to adjust in the direction indicated. If this second output is less than reference A, adjustment is made in the other direction. Thus, the head or torch H is kept centered along the predetermined travel path. To prevent hunting, the 785 signal to 786 acts as a null so that no corrective action is initiated unless these differences exceed the reference A value, e.g. ±0.8 volts. Means for such control are well known in the art and need not be described in further detail.

Meanwhile, the signals fed to hold units 780 and 781 also are fed into a width control unit 790 where they are added to obtain a sum $\Sigma I$. Means for accomplishing such additions are known in the art, as are the substraction means in unit 784, and will not be described herein. The output of unit 790 is passed to a comparator 792 where it is compared with a reference signal B, provided by a potentiometer 791. The latter can be set to a desired voltage level by manual adjustment to determine just how close to the walls an arc that is centered should come. This reference value can vary with different materials, welding conditions, and joint designs. In comparator 792, if the sum $\Sigma I$ exceeds the reference value B, a width control device 793 is actuated by the output of 792 to make the path narrower. If $\Sigma I$ is less than reference B, adjustment is made to widen the path or width of oscillation. Any suitable adjusting means may be used for this purpose, such as an automated form of the manually adjustable reciprocating means disclosed in the above mentioned U.S. Pat. No. 3,903,391, or other automatic adjusting device, which is not part of this invention, but forms the subject matter of another application, as will be obvious to those skilled in the art.

The sample and hold system just described is of great importance in the present process. It will be further explained in connection with FIG. 6 after a brief discussion of some typical welding and weld head control operations.

Figure 4:
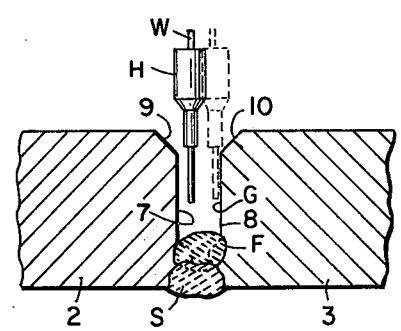
FIG. 4 is a fragmentary view in section, partly diagrammatic, of a typical weld joint involving a narrow gap to be filled and illustrating one method of lateral reciprocation of a welding instrument.
Figure 5:
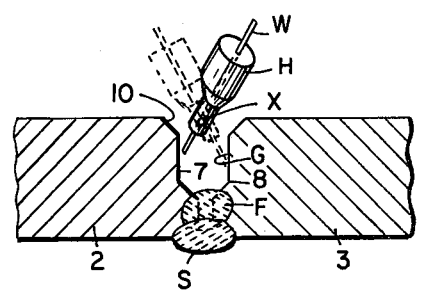
FIG. 5 is a view similar to FIG. 4 of another method of lateral reciprocation.

Referring now to FIGS. 4 and 5, there are shown two adjoining work members 2 and 3 which define the outside and inside walls of a gap G to be filled with weld metal. In both figures, a partial weldment already has been made by earlier operations. In the case of a pipe joint, an initial or stringer bead pass S may have been made from within the pipe in the manner or by the apparatus described in above mentioned U.S. Pat. No. 3,461,264. This may have been followed by a so-called "hot" pass, F, applied above and fused into the first pass S. The remainder of the gap is still to be filled. Assuming that this gap is of a width such that lateral reciprocation of the arc is needed to fill it properly and bond well to both gap walls, the head H travels longitudinally along the gap and also is reciprocated across it as it travels.

Gap G is shown as having more or less vertical walls 7 and 8 and an outside flare or bevel 9 or 10 at the top. Other joints designs may be used.

The expendable filler wire W electrode of known type is to be fed into the arc of heat source and fused and bonded to the side walls and to the underlying hot or filler pass F. It is fed by suitable wire drive means from a reel or other supply source, not shown, passing through the head H and projecting into the arc where it is fused and deposited in the gap.

In the case of FIG. 4, the head or torch H is reciprocated in simple translation back and forth across the gap G. In dotted lines, the head and wire are shown as stopping closer to the outside or right wall than to the other wall, as shown in full lines, and the head needs to be adjusted slightly towards the left. In FIG. 5, the head is oscillated angularly about a pivot or axis X, so that the wire W projects alternately and at an acute angle towards one wall and the other. Here again, it is shown displaced slightly to the right, needing correction towards the left or inside wall in its travel along the gap G. Of course, correction might be made in the case of FIG. 5, by changing the limits of oscillation, so that the head would swing farther to the left, i.e. clockwise, than in the other direction. But if this were done, the angles of approach of the wire to the two side walls could be quite different and this could cause problems. Hence, centering of the travel path can be important in either FIG. 4 or FIG. 5. Also, the width or amplitude of oscillation in either case may need correcting. An important part of the present process, as already suggested, is to obtain signals from the arc which are meaningful and properly timed with respect to arc traversal of the gap, so that needed correction can be signaled and accomplished before the arc has strayed too far from its proper course.

Figure 6:
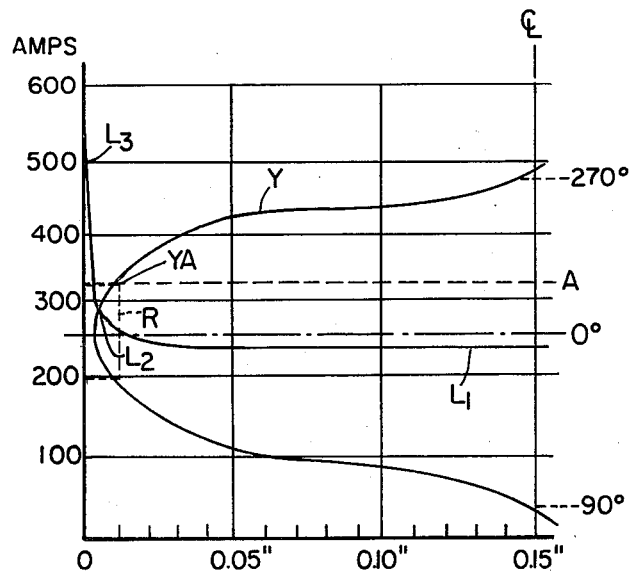
FIG. 6 is a graphical representation of a procedure for obtaining timed signal samples at critical points in a reciprocation to isolate data that can be used for purposes of the present process.

FIG. 6 is a graph of travel and traverse of the head, showing a half cycle trace Y from mid-gap position to one side and back to mid-gap. The other half of a complete cycle is generally similar but is not shown, for simplicity. Taking an extreme side position as the zero point in the head oscillation cycle, the head passes midpoint in the gap when properly centered at 270° of the full cycle and returns to mid-gap position at 90°. Meanwhile, the head has traveled along the main path, shown in degrees at the right column in FIG. 6. The distance depends on the forward travel speed and the transverse oscillation frequency. In a typical case, travel may be about 1/10 inch for each complete cycle of reciprocation, with reciprocation normally between about 1 and 20 cycles per second. At a given moment A, the head, will be at position YA on curve Y. As it approaches near the side wall, as already explained, the current increases, as shown by curve $I_o$, from a fairly level average value (although it is actually moving between side walls or extremes at the desired reciprocation frequency, see FIGS. 1(A) and 1(B) to a somewhat higher level $L_2$. If approach continues into the wall, $I_o$ in a typical case may reach a very high level $L_3$, as much as 500 amperes or more, from an average value $L_1$, of about 240 to 260 amperes. In the normal case, the rise due to wall approach will be much less than such an extreme value, typically one to two percent of average value or only a few amperes.

During a time period which may vary, but which may be from about $-30°$ to $+30°$ of the cycle, in a preferred case, the arc is near the wall and making its dwell and turn-around. Current at the arc, represented in FIG. 6 by $I_o$, rises appreciably during this turn-around, the reciprocation curve Y passing more or less diagonally through the small rectangle R during this period of time. By the means described above, a time sample signal or signals will be taken, the time being limited to the turn-around and dwell time of the arc near a side wall. This produces the signal peak values 704 or 706 of FIG. 2(B).

FIG. 7 shows a hydraulic-mechanical system for oscillating the head $H_1$ in a gap $G_1$ between work parts 2 and 3 and for correcting both its center line position and its width of oscillation, when required. Wire W is fed through the head $H_1$ from a supply 21. The head is pivotally mounted at 31 on a movable frame 30 which can be shifted to the right of the left by a piston 34 in a hydraulic cylinder 32 mounted on a relatively fixed base, i.e. on a traveling carriage which moves the welder along its main path. Fluid may be forced into or out of the cylinder 32 by a suitable pump, not shown, to move piston 34 to right or left. Thus, the center line position of the head may be adjusted.

For oscillating the head $H_1$ about its pivotal support 31, a piston rod 36 is connected to the head at 37 above point 31 and is moved right or left by a piston 38 in a hydraulic cylinder 39. A strong coil spring 40 inside the cylinder normally urges the piston to the left but it can be overcome when hydraulic fluid at the left of piston 38 forces the piston to the right. Fluid is supplied to the cylinder 39 through line 41 from another hydraulic cylinder 42 which contains a movable piston 43 adapted to be reciprocated up and down by a rotatable wobble plate 44. A follower 46 on the bottom of the piston shaft 47 causes the piston to rise and force fluid into cylinder 39 on half a rotation of the wobble plate. During the other half rotation, the spring 40 forces the fluid back into cylinder 42 and pushes piston 43 down. The wobble plate is pivotally mounted on a rotary shaft driven by a motor 48 secured to the movable frame 30. A turnbuckle 50 between the wobble plate and its shaft permits the angularity of the plate with respect to its supporting shaft to be varied, thus adjusting the stroke of the pistons 43 and 38 and varying the width of oscillation, as desired.

FIG. 8 shows a simpler system which provides only for adjustment of the width of oscillation. Wire W from supply 55 is fed through the head $H_2$ to the arc. The head is pivoted at 54 to a fixed support and is oscillated back and forth across gap $G_2$ by a rack bar 56 pivoted to the head below its fixed pivot point and driven back and forth by a reversible motor 58 geared to the rack bar by a pinion 57. By varying the limits of rotation of motor 58, the width of oscillation and, to a certain extent, the center line of travel can be adjusted. However, the centering adjustment may be at the expense of good control of wire angle of approach to the side walls, in contrast to the arrangement of FIG. 7. Improved means and method for angle control is the subject of a separate application.

FIG. 9 shows a one wall situation. The head $H_3$ is being pivotally oscillated about a low pivot point or axis 88 which is rather near the arc. Because of the low pivot position, the angles of wire approach to the wall 86 and base 87 can be adjusted between wide limits to secure superior operations. This arrangement also may be used for filling a Vee gap. Ordinarily, the head would be set to bisect the angle between the two parts. Within gap width limits, this same feature may be applied to the systems of FIGS. 4, 5, and others. While the adjusting means are no shown in this Figure, mechanism such as in FIGS. 7, 8 or 10 can be used with the system of FIG. 9, as will be obvious. For a Vee gap, the head may be tilted to an appropriate gap angle bisecting a position clockwise from FIG. 9, as also will be obvious.

FIG. 10 shows a mechanical system for controlling center line position of the arc and the angular position of the head, as well as means for oscillating the head and varying the oscillation width. A welding head $H_4$ is oscillated within gap $G_4$ about a momentarily fixed pivot point on a shiftable support 90. The latter has rack teeth on its upper edge for meshing with gear teeth of a pinion 92 fixed to a reversible stepping motor 91 mounted on a relatively fixed main frame 89. Support 90 is slidably mounted to constrain it to rectilinear motion to right and left. Shifting it right or left will change the center line position of travel of the head $H_4$ in gap $G_4$. An arm 96 is oscillated to right and left by a crack 93 on wheel 94 driven continuously in one direction by a suitable motor 95. A link 97 connects arm 96 to head $H_4$, its left end being pivoted but adjustable in elevation in a vertical slot in arm 96. By raising or lowering the left end of link 97 in this slot, the stroke of oscillation of head $H_4$, may be varied. Such adjustment is accomplished by a small reversible motor 99 pivotally mounted at 98 on support 90 having a threaded shaft $99_A$, which engages a nut $99_B$ pivotally supported in a hole in link 97. By these means center line adjustment, or width of oscillation of head $H_4$, or both, may be easily accomplished, as will be readily understood.

FIG. 14 shows graphically another aspect of the present invention which needs to be explained here. A narrow gap $G_5$ is shown between adjoining work pieces 2(A) and 3(A), which may be ends of adjoining pipe, or edges of plates side by side, or any one of many types of work. The gap $G_5$ is narrow enough that transverse oscillation of the head is not really required for filling it properly. However, in this case, as in the cases already described, the arc may not remain properly centered during its travel along the gap, resulting in possible weld defects. In order to maintain precision center line travel, the head is oscillated very narrowly, i.e., has less than gap width, $G_5$ as indicated at trace 800, for the purpose of obtaining control signals related to the correctness of its path. These signals will be sampled at extreme lateral positions, as described above. In other words, even though oscillation for gap filling is not needed, the arc is deliberately oscillated or reciprocated laterally, through a very narrow traverse path, to generate a carrier wave and peaks signals such as 714 and 716, FIG. 2(C), for control purposes. With these signals, appropriately processed and sampled, the welding instrument is kept in line by any suitable centering means shown broadly at 787, FIG. 3, with appropriate controls as described above.

FIG. 11 shows an alternative signal timing or commutator means, a variation of that shown in FIG. 3. Instead of having two sets of arms and followers, a single cam 101 is provided with two lobes 101(A) and 101(B) to move a single arm twice in each cycle. Lobes 101(A) and 101(B) lift an arm 103(A) through its follower 102(A), to close the contacts of a switch 104(A) twice in each revolution. This may, of course, require the use of supplemental switching means in the circuitry if it is desired to distinguish one side wall from the other, as will be obvious to those skilled in the art.

FIGS. 12 and 13 show graphically how the signals discussed above may be recorded on a chart or shown on an oscilloscope. These may be used directly, if desired, to guide a human operator in making manual adjustments of a conventional welding machine, such as that shown in U.S. Pat. No. 3,806,694 or any other suitable tracking welder device. In FIG. 12, the average arc current $S_1$ (see FIG. 1(A), is quite steady during the major part of the heat reciprocation cycle but rises at 700(A) and 700(B) as the arc comes close to the respective side walls. FIG. 12, however, does not directly make it clear which side wall is which unless repeated on an oscilloscope with one side being one wall. In FIG. 13, the outside wall signal 722 (see FIG. 2(D) is shown negative wand the inside wall signal 724 is shown as positive. Such signals may be obtained by conventional switching means which form no part of the present invention. This arrangement makes it easier for a human operator to tell directly from the chart or oscillogram which side of the wall is being observed at a given instant.

As in the case of FIGS. 12 and 13, the oscillograms or recording traces, may be used to guide a human operator in making manual adjustments of center line or width control. The same signals, obviously, may also be used for automatic control, by use of appropriate drive and control means, several examples of which have been described. See especially FIG. 3.

FIG. 15 shows a visual signal device for displaying information to guide a human operator in his manual control. It includes a group of three lights at the bottom which show trends of the welding instrument away from proper centerline position. At the top, another group of three lights shows width of oscillation. A red light 259 at the left indicates too close an approach to both walls; a red light at the right 261 shows that the width of oscillation is too narrow. A green light 260 in the middle shows that the width is correct. A meter 262 with a pointer gives similar information and may supplement or even replace the lights in some cases. At the botton, right, and left red lights 266 and 264 show malposition to right and left and a green light 265 between them indicates that the travel path is properly centered. Here again, a meter 267 with a pointer may be used to supplement or to replace the lights.

In FIG. 16, a somewhat different arrangement is shown, having five lights in a row for each of the walls. A green light 270 in the middle of the left group indicates correct welder position with respect to the outside wall; yellow lights 271 and 272 on either side indicate incipient malpositions in their respective directions, and red lights at extreme left and right, as shown at 273 and 274, indicate a significant misalignment or malposition which will result in flaws it not corrected at once. Similarly, at the right, green light 277 in the middle, yellow lights 276 and 278 on either side, and red lights 275 and 279 on the extremes indicate the conditions at the right or inside wall, Here again, meters 281 and 282 may be added. Details of connections to these lights from control devices form no part of the present invention.

The arrangement of FIG. 16 has some advantages in showing incipient as well as serious conditions at each wall, regardless whether they are caused by misalignment along the main path or an erroneous width of oscillation. With so many lights, on the other hand, they may tend to cause confusion with some operators.

Visual warnings using warning lights or meters, as just discussed, or those obtained by direct observation of electronic oscillograms or charts, may be described in broad terms as being used for initiating correction, even though the actual corrective operations are done manually. Visual signals may be used also, as input to photocell devices which may be arranged to carry out the needed corrections through appropriate automatic mechanisms, as will be obvious.

In the claims which follow, reference to "extreme lateral" position of the arc or other heat source (as during sampling), or to its being at or near "sidewall position" will be understood to refer to those periods of time during which the arc or the electrode moved sufficiently close to a wall or structure to give a meaningful signal. Useful signals are not necessarily limited to the precise instant of closest approach. They will be understood in a graphical sense as referring to limited time durations, fractions of complete cycles comparable to the finite width of the small rectangle in FIG. 6, shown at R., or to a generally equivalent time, such as is indicated at $T_1$ and $T_2$, top of FIG. 3. Expressions such as timed "sample signals" or commutated signals, will be understood, then, to refer to short times of small parts of continuing cycles, during which signals are taken by an appropriate sampling means or system, typified by the cam means of FIG. 3 or FIG. 11, but by no means limited to use of such devices. These signals are taken for control purposes at the times when they are meaningful and when they can be directly related to the lateral and temporary or instantaneous instrument or heat source position, either at a wall or some analogous upwardly or outstanding projecting structure or near to it. Such signals are limited in time, and thus are clearly to be distinguished from the contiuous signals representing a continuing arc current, voltage, or the like, as shown graphically in FIGS. 1(A) and 1(B), for example.

As has been emphasized above, the dependently variable characteristic, which varies with lateral welder position with respect to the side wall or equivalent upraised structure, and is used to generate a continuous or carried signal, is not limited to arc current at all. Broadly, it may be any meaningful characteristic from a probe such as voltage, power, light intensity, sound, etc., which is dependently variable on the basis of a disturbing feature related to lateral position, with respect to a predetermined main travel path of an electric arc or heat source or equivalent device capable of generating a signal that can be used for guidance purposes.

In cases when the welding, or analogous operation, proceeds along a single wall or single disturbing feature, as distinguished from a gap between a pair of opposite side walls or pair of disturbing features, the signal $\Sigma I$, mentioned above, may be compared with an approriate value B set into the potentiometer 791, FIG. 3. If the signal exceeds the value of B, the controller 793 can be activated to move the center line of travel away from the single wall. If the signal is less than the set value B, the controller 793 will be actuated to move the center line closer to the wall. In this way, the method for controlling width or amplitude of oscillation in the usual gap, may be used for controlling welder or other device travel along a single upraised wall.

In general terms, it may be said that the essential invention involves a process based on the use of a probe or welding device having a characteristic which varies dependently with a disturbing feature related to lateral position, i.e., with respect to an edge, a sidewall, or a pair of sidewalls, to obtain usable signals; the latter are then employed for indicating, monitoring, initiating or controlling lateral position and/or needed corrective action. The signals so obtained, which per se are continuous and have a component related to position, are clarified and are associated with time sampled signals to correlate lateral position of this probe or other instrument with this signal variations which arise from its lateral movement. Resultant or composite signals so obtained are amplified, where necessary, are compared, either with each other and/or with other standards, e.g., by subtracting, etc., to detect incipient malpositioning or improper lateral movement of the probe, it normally being a heat source, electrode or arc. Then, the needed corrective action can be initiated or accomplished before the malpositioning produces weld imperfections.

The term "electric welding", as used above and in some of the claims, is intended to refer generically and broadly to welding with any electric of electronic system, wherein an electrode or other filler material is fused by a suitable heat source for deposition in a gap or joint. The invention is applicable to various kinds of operations, regardless of whether the probe is for guidance purposes only or is related to welding or the heat souce is an electric arc, a plasma jet, electron beam, laser, or some other means. The principles of the invention appear to be applicable alike to all such systems. More specifically, of course, the invention is applicable to control of an arc welding instrument, making use of variations in signals which relate to lateral arc position as the arc travels along a predetermined weld path. Whether such path is rectilinear or curvilinear, regular or irregular, makes no difference in principle. Obviously, the invention has a specific application to the welding of adjacent annular work members to form a girth joint and, particularly, to the welding of girth joints in pipe lines. In its broad aspects, however, the invention is certainly and clearly applicable to many other uses and structures.

In general, it is intended by the claims which follow to cover the above process embodiments, their variations and modifications, together with others not disclosed which would suggest themselves to those skilled in the art, as broadly as the state of the prior art properly permits.

What is claimed is:

1. In welding where an electric arc welding torch moves in an undulating path along a gap having spaced opposed sidewalls to deposit metal in said gap for joining said walls into a unitary structure and where a continuous signal having various frequency components is generated at the torch and in which the torch is caused to weave laterally across said gap, the steps of:
   (a) imposing a periodic extreme lateral position-indicating amplitude-modulated carrier signal on said continuous signal, said imposed signal being of frequency different from components contained in said continuous signal to obtain a composite signal having periodic values varying in amplitude corresponding to consecutive extreme lateral positions and containing other signal components which tend to conceal said periodic values;
   (b) removing said concealing signal components from said composite signals by filtering to isolate said periodic values;
   (c) taking discrete samples of said periodic values;
   (d) summing the signal amplitude values occurring at said opposed sidewalls to produce a sum signal;
   (e) comparing said sum signal to a reference value; and
   (f) using the result of such comparison to control the width of said weaving path of said arc between said sidewalls.

2. In welding wherein a torch which weaves laterally back and forth across a mean welding path and towards and away from predetermined extreme lateral positions along said path where the welding current tends to rise when the torch approaches said extreme lateral positions, the steps comprising:
   (a) detecting the amount of welding current passing through the arc during at least at the times when the arc is the vicinity of said extreme lateral positions;
   (b) storing functions representative of the detected amounts of current flowing during times when the torch is in the vicinity of said extreme lateral positions;
   (c) summing the stored function representative of the current flowing when in the vicinity of one extreme lateral position with the function representing the current flowing when in the vicinity of the other extreme lateral position to produce a sum function;
   (d) comparing said sum function with a function representative of a reference value; and
   (e) in response to said comparison changing the magnitude of the weaving motion.

3. In welding where an electric arc welding torch moves along a gap having spaced opposed sidewalls to deposit metal in said gap for joining said walls into unitary structure and in which the torch is caused to weave laterally across said gap, the steps of:
   (a) continuously sensing the arc current to obtain a signal having periodic values varying in amplitude corresponding to consecutive extreme lateral positions;
   (b) summing the signal amplitude values occurring at said opposed sidewalls to produce a sum signal;
   (c) comparing said sum signal to a reference value; and
   (d) using the result of such comparison to control the width of said weaving path of said arc between said sidewalls.

4. In welding where an electric arc welding torch moves in an undulating path along a gap having spaced opposed sidewalls to deposit metal in said gap for joining said walls into a unitary structure and where a continuous signal having various frequency components is generated at the torch and in which the torch is caused to weave laterally across said gap:
   (a) means for imposing a periodic extreme lateral position-indicating amplitude-modulated carrier signal on said continuous signal, said imposed signal being of frequency different from components contained in said continuous signal to obtain a composite signal having periodic values varying in amplitude corresponding to consecutive extreme lateral positions and containing other signal components which tend to conceal said periodic values;
   (b) filtering means for removing said concealing signal components from said composite signals to isolate said periodic values;
   (c) means for taking discrete samples of said periodic values;
   (d) means for summing the signal amplitude values occurring at said opposed sidewalls to produce a sum signal;
   (e) means for comparing said sum signal to a reference value; and
   (f) means for using the result of such comparison to control the width of said weaving path of said arc between said sidewalls.

5. In welding wherein a torch which weaves laterally back and forth across a mean welding path and towards and away from predetermined extreme positions along said path where the welding current tends to rise when the torch approaches said extreme lateral positions:
   (a) means for detecting the amount of welding current passing through the arc during at least at the times when the arc is in the vicinity of said extreme lateral positions;
(c) means for summing the stored function representative of the current flowing when in the vicinity of one extreme lateral position with the function representing the current flowing when in the vicinity of the other extreme lateral position to produce a sum function;
(d) means for comparing said sum function with a function representative of a reference value; and
(e) means operable in response to said comparison for changing the magnitude of the weaving motion.

6. In welding where an electric arc welding torch moves along a gap having spaced opposed sidewalls to deposit metal in said gap for joining said walls into unitary structure and in which the torch is caused to weave laterally across said gap:
(a) means for continuously sensing the arc current to obtain a signal having periodic values varying in amplitude corresponding to consecutive extreme lateral positions;
(b) means for summinng the signal amplitude values occurring at said opposed sidewalls to produce a sum signal;
(c) means for comparing said sum signal to a reference value; and
(d) means for using the result of such comparison to control the width of said weaving path of said arc between said sidewalls.

* * * * *

UNITED STATES PATENT AND TRADEMARK OFFICE
CERTIFICATE OF CORRECTION

PATENT NO. : 4,380,695
DATED : April 19, 1983
INVENTOR(S) : Jerome W. Nelson

It is certified that error appears in the above—identified patent and that said Letters Patent is hereby corrected as shown below:

Column 1, line 3 in the title, delete "WELDING".
Column 1, line 29, change "wide" to --side--.
Column 1, line 38, change "2,777,115" to --3,777,115--.

Column 1, line 66, change "2,561,320" to --3,561,320--.
Column 4, line 3, change "and" to --to--.
Column 4, line 30, change "OH" to --OW--.
Column 5, line 41, change "signals 734" to --signals 732--.
Column 6, line 5, change "tht" to --that--.
Column 10, line 22, change "deliverately" to --deliberately--.
Column 10, line 24, change "peaks" to --peak--.
Column 10, line 55, change "wand" to --and--.
Column 11, line 13, change "botton" to --bottom--.

Signed and Sealed this

Eighteenth Day of October 1983

[SEAL]

Attest:

GERALD J. MOSSINGHOFF

Attesting Officer    Commissioner of Patents and Trademarks